US006021879A

United States Patent [19]

Pelouch

[11] Patent Number: 6,021,879
[45] Date of Patent: Feb. 8, 2000

[54] ROTATING CLUTCH BALANCE APPARATUS

[75] Inventor: Robert Joseph Pelouch, Martinsville, Ind.

[73] Assignee: General Motors Corporation, Detroit, Mich.

[21] Appl. No.: 09/287,219

[22] Filed: Apr. 5, 1999

[51] Int. Cl.[7] .......... F16D 23/10

[52] U.S. Cl. .......... 192/106 F; 192/85 AA; 192/87.11; 192/87.15

[58] Field of Search .......... 192/106 F, 87.11, 192/87.14, 87.15, 85 AA

[56] References Cited

U.S. PATENT DOCUMENTS

| | | | |
|---|---|---|---|
| 4,664,242 | 5/1987 | Downs | 192/106 F |
| 4,759,432 | 7/1988 | Jurgens et al. | 192/85 AA |
| 5,226,517 | 7/1993 | Grochowski | 192/85 AA |
| 5,259,489 | 11/1993 | Kimura et al. | 192/85 AA |
| 5,411,123 | 5/1995 | Rej et al. | 192/85 AA |

*Primary Examiner*—Charles A Marmor
*Assistant Examiner*—Saúl Rodriguez
*Attorney, Agent, or Firm*—Dean L. Ellis

[57] ABSTRACT

A fluid operating clutch has an apply chamber and a centrifugal balance chamber. The balance chamber is disposed radially outward of the apply chamber. The area of the chambers is varied inversely with the effective radius such that the balance chamber has less area than the apply chamber. When the clutch is engaged, the balance chamber is filled prior to the apply chamber to prevent premature "drift on" of the clutch. The balance chamber does not effect normal operation of the clutch, but does continue to provide centrifugal balance throughout the operating range of the clutch.

3 Claims, 1 Drawing Sheet

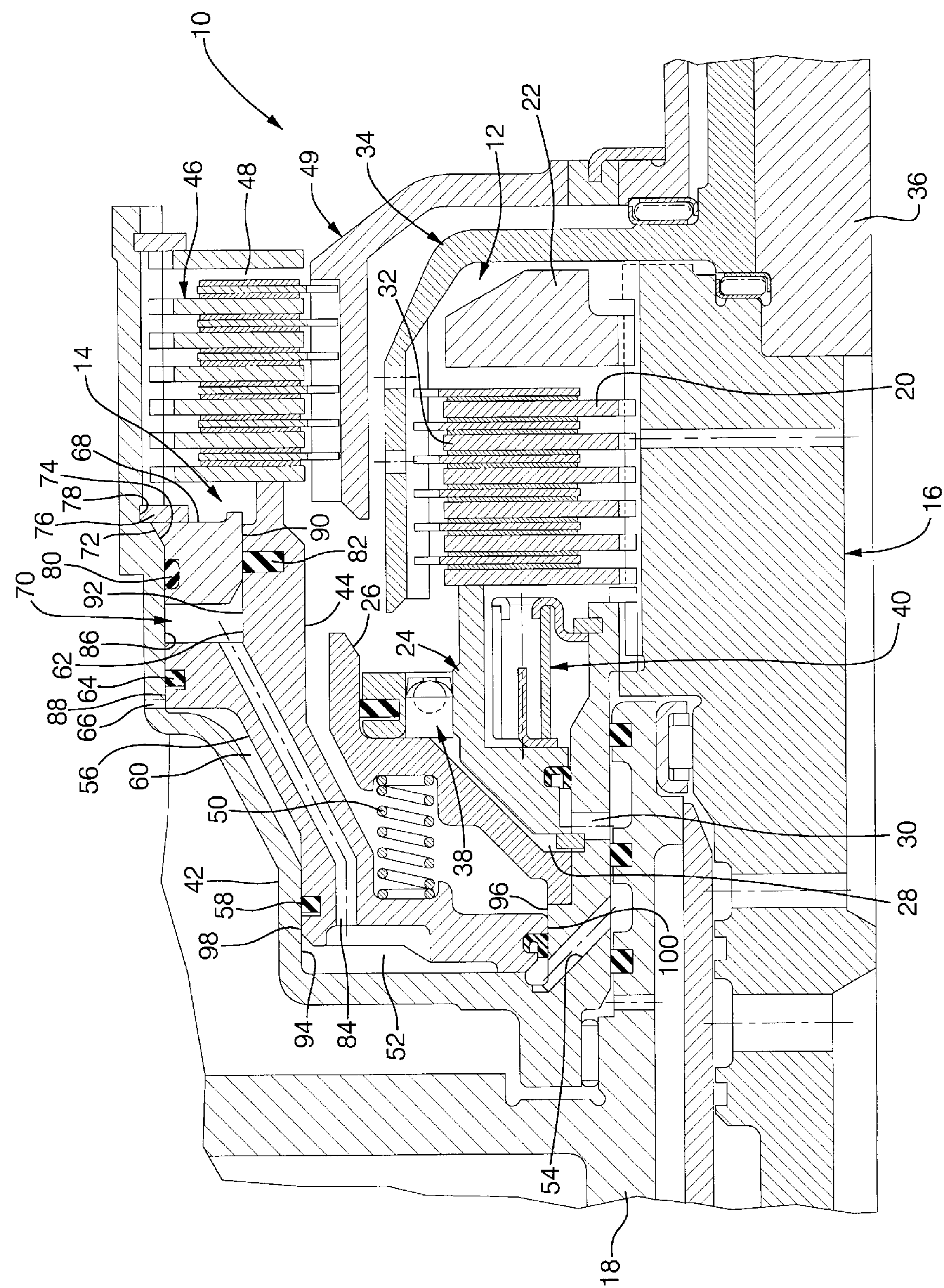
10
46
48
49
34
12
22
36
32
20
14
68
74
78
76
72
80
92
70
86
62
64
88
66
56
60
90
82
44
26
24
40
16
38
50
30
28
42
58
98
96
100
94
84
52
54
18

ROTATING CLUTCH BALANCE APPARATUS

TECHNICAL FIELD

This invention relates to apparatus for balancing the centrifugal force in a rotating, fluid operated, selectively engageable, friction clutch.

BACKGROUND OF THE INVENTION

Fluid operated clutches have a substantially cylindrical apply chamber which is filled with pressurized fluid when the clutch is to be engaged. When the clutch is disengaged, the pressure of the fluid is reduced. All of the fluid is not, however, exhausted and continued rotation of the clutch housing can result in a centrifugal pressure being generated in the clutch apply chamber. This can lead to "drift on" of the clutch when the centrifugal pressure overcomes the force in the apply piston return springs.

There have been many approaches to solving this problem. The most common of these solutions involves the use of a ball dump valve which exhausts the clutch apply chamber of fluid when the rotating speed is above a design speed and the clutch is in a disengaged state. This can result in air ingestion into the apply chamber if the clutch apply passage is fully evacuated.

Another solution is to increase the release force of the return springs to a level above the maximum centrifugal pressure expected. This will increase the apply pressure needed to engage the clutch thereby increasing the energy requirements of the hydraulic control system and decreasing the overall efficiency of the transmission.

A third solution is to provide a balance chamber opposite the apply chamber of the clutch. This design option has become useful when two or more clutches are nested in radial alignment. However, this option requires that the balance chamber to have a continuous supply of hydraulic fluid, separate from the clutch apply fluid to insure the operation thereof. To satisfy this requirement an additional fluid passage must be incorporated in the shaft and/or the support sleeve for the clutch. While each of the above solutions will prevent "drift on" of the clutch, they do present some drawbacks and design complications.

SUMMARY OF THE INVENTION

It is an object of the present invention to provide an improved clutch structure for providing a rotating balance apparatus.

In one aspect of the present invention, a balance chamber is formed radially outward of a clutch apply piston. In another aspect of the present invention, a fluid passage is provided for connecting the apply chamber of the clutch piston with the balance chamber. In yet another aspect of the present invention, the balance chamber is partially formed in the apply piston. In still another aspect of the present invention, the balance chamber is bounded by the apply piston, the clutch housing and a closure ring secured in the clutch housing.

In a further aspect of the present invention, the balance chamber and the clutch apply chamber rotate in unison. In yet a further aspect of the present invention, a single fluid source feeds both a clutch apply chamber and the balance chamber. In still a further aspect of the present invention, the balance chamber has a smaller effective area than the effective area of the apply chamber. In yet still a further aspect of the present invention, the balance chamber is disposed radially outward of the apply chamber.

BRIEF DESCRIPTION OF THE DRAWINGS

The drawing is an elevational view, in section, of a nested clutch assembly.

DESCRIPTION OF AN EXEMPLARY EMBODIMENT

A nested clutch assembly 10 has an inner fluid operated selectively engageable friction clutch assembly 12 and an outer fluid operated selectively engageable friction clutch assembly 14. An input shaft 16 is rotatably mounted in a stator support 18 to provide rotary input to the clutch assembly 10. The inner clutch assembly 12 has a plurality of clutch plates 20 and a backing plate 22 splined to the input shaft 16 for common rotation therewith. A clutch piston 24 is also splined to the input shaft 16 and is slidably disposed in a housing 26. The piston 24 and the housing 26 form a clutch apply chamber 28 which is in fluid communication with a passage 30. When the clutch is to be engaged, pressurized fluid is directed to the passage 30 and chamber 28 in a well known manner.

The inner clutch assembly also has a plurality of friction plates 32 alternately spaced with the clutch plates 20 and splined to an output hub 34. The output hub 34 is connected with a clutch output shaft 36 which transmits the clutch output to a conventional planetary gear set, not shown when the clutch is engaged by pressurized fluid in the chamber 28. The piston 24 has installed therein one or more conventional ball dump valve assemblies 38. As is well-known, the valve assembly 38 will exhaust the apply chamber when the pressure therein is reduced. As the speed of the clutch housing increases, the valve assembly 38 will exhaust at higher chamber pressures due to the centrifugal opening force on the valve assembly. When the clutch apply chamber is exhausted, a return spring assembly 40 urges the clutch piston 24 to a disengaged position to release the torque capacity of the clutch assembly 12.

The stator shaft 18 rotatably supports an input housing 42 which is a component in the clutch assembly 14. The housing 42 is splined to the input shaft 16 for common rotation therewith. The housing 42 is secured with the housing 26 of the clutch assembly 12 such that these members rotate in unison. The clutch assembly 14 also includes an apply piston 44, which is slidably disposed in the housing 42; a plurality of clutch plates 46, which are splined to the housing 42; a plurality of friction plates 48, which are splined to an output hub 49; and a plurality of return springs 50. The housing 42 and the piston 44 cooperate to form a clutch apply chamber 52 which communicates with a passage 54 to receive and exhaust fluid from the chamber 52. When the clutch assembly 14 is to be engaged, the passage 54 is connected with a conventional control and pressure source, not shown, in a well-known manner. The passage 54 is connected with a transmission reservoir, not shown, through the control when the clutch assembly 14 is to be disengaged. However, all of the fluid in the chamber 52 will not be withdrawn, especially if the clutch is rotating during disengagement.

The piston 44 has an annular skirt portion 56 extending outwardly from the chamber 52. An annular seal 58 prevents fluid communication from the chamber 52 to a space 60 formed between the skirt portion 56 and the housing 42. The skirt portion 56 has an annular recess 62 formed at the outer periphery thereof. The annular recess is sealed from fluid communication with the space 60 by an annular seal 64. The space 60 is exhausted to the interior of the transmission through a passage 66 to prevent any inadvertent leakage from accumulating in the space 60.

The annular recess 62 is closed by a closure ring 68 such that a balance chamber 70 is formed and bounded by the skirt 56, the housing 42 and the balance ring 68. The balance ring has an annular retaining lip 72 which cooperates with a notch 74 formed in the housing 42 to limit the leftward movement of the balance ring 68 relative to the housing 42. A conventional retaining ring 76 is secured in a notch 78 formed in the housing 42 to limit the rightward movement of the balance ring 68 relative to the housing 32. Thus the balance ring 68 is essentially immobile relative to the housing such that the balance chamber 70 will expand and contract upon axial movement of the piston 44 in the housing 42. The balance chamber is sealed from atmosphere inside the housing by an annular seal 80 installed in the balance ring 68 and an annular seal 82 installed in the piston 44. The balance chamber 70 and the apply chamber 52 are interconnected for fluid communication by a passage 84. Thus when the housing 42 is rotating and the apply chamber 52 is supplied with fluid, the balance chamber 70 will be filled with fluid, because of the centripetal force, before the chamber 52 is filled. This will insure that the clutch assembly 14 will not be applied inadvertently.

The housing 26 has an outer cylindrical wall 86 which cooperates with an outer surface 88 of the piston 44 to establish the outer boundary of the chamber 70; and the balance ring 68 has an inner cylindrical surface 90 which cooperates with a cylindrical surface 92 of the recess 62 to form the inner boundary of the chamber 70. The housing 26 also has an intermediate cylindrical wall 94 and an inner cylindrical wall 96 which cooperate with an intermediate surface 98 and an inner surface 100 respectively, of the piston 44, to form the apply chamber 52. The chamber 52 has a larger effective surface area as compared with the effective surface area of the chamber 70. However, the chamber 70 has a larger effective radius as compared with the chamber 52. Since the centrifugal pressure head is proportional to the effective radii of the chambers 52 and 70, the area of the chamber 70 is accordingly smaller to achieve the pressure balance required to offset the centrifugal pressure head on the piston 44 urging the clutch 14 into engagement.

The input shaft 16 is connected with a power source, not shown, which will generally include an internal combustion engine and a torque converter. Both of these devices are well-known to those skilled in the art. The power source will rotate the clutch housing whenever the vehicle in which the nested clutch assembly 10 is installed or whenever the vehicle powertrain is in neutral and the engine is operating.

To engage the clutch 14, the passage 54 is supplied with pressurized fluid from a conventional control system not shown. When this occurs, the housing 42 will be rotating such that the centrifugal force acting on the fluid entering the apply chamber 52 will cause the fluid to be communicated to the balance chamber 70 through the passage 84. Since both the apply chamber 52 and the balance chamber 70 are rotating at the same speed, a centrifugal pressure head will be developed in both of the chambers 52 and 70.

The apply chamber 52 has a larger effective area than the effective area of the balance chamber 70; but the balance chamber 70 has a larger effective radius than the apply chamber 52 which results in a higher centrifugal pressure head in the balance chamber 70 for a given rotary speed of the housing 42. By selecting the proper areas and radii for the chambers 52 and 70, the forces acting on the piston 44 from the centrifugal pressure head will be cancelled. However, the static apply pressure acting in the chamber 42 will exert a much greater axial force on the piston 44 than the static apply pressure acting in the chamber 70. The control can be programmed to account for the area differential between the chambers to provide the necessary static apply pressure. However, the centrifugal pressure head will not be effective to increase the apply force on the piston 44 due to the balancing effect of the balance chamber 70.

The above described balancing apparatus has distinct advantages over the use of a ball dump valve. The apply chamber and the balance chamber have the same fluid source. Since both cavities remain filled during operation, there is no centrifugal effect variation of apply pressure when the clutch is engaged or disengaged. The consistency of the clutch balance over all operating conditions allows the return springs to be of minimal size which can permit increased clutch capacity for a given piston size and/or overcome the effect of static apply pressure acting in the balance chamber. Centrifugal balance is obtained over all clutch speeds. The use of a single source of fluid is an advantage over other balance chamber devices currently available thereby reducing the design complexity an the need to provide a separate fluid source.

I claim:

1. A selectively engageable fluid operated friction clutch assembly comprising:

a housing;

a piston slidably disposed in said housing;

a first chamber formed between said housing and said piston for selectively enforcing axial movement of said piston to engage said clutch;

a second chamber formed between said housing and said piston for enforcing axial movement of said piston to disengage said clutch in response to a centrifugal pressure in said second chamber, said second chamber being positioned radially outwardly of said first chamber; and passage means for providing fluid communication between said first and second chambers.

2. The clutch assembly defined in claim 1 further comprising:

said housing including a balance ring, said balance ring having an inner cylindrical surface slidably engaging said piston; and said second chamber being bounded by said piston, said balance ring and a wall of said housing.

3. A fluid operated selectively engageable clutch comprising:

a rotatable housing having an outer cylindrical wall, an intermediate cylindrical wall; an inner cylindrical wall and an annular balance wall;

a piston having an inner surface slidably engaging said inner cylindrical wall, an intermediate surface slidably engaging said intermediate cylindrical wall and an outer surface slidably engaging said outer cylindrical wall and an outer annular recess having;

a rotatable apply chamber formed by said piston and said housing between said inner cylindrical wall and said intermediate cylindrical wall; and a rotatable balance chamber formed by said outer cylindrical wall and a surface of said piston slidably engaging an inner surface of said balance wall.

* * * * *